(12) United States Patent
Titmuss et al.

(10) Patent No.: US 8,089,492 B2
(45) Date of Patent: Jan. 3, 2012

(54) ON-SCREEN COLOUR SELECTION

(75) Inventors: Geoff Titmuss, Malvern (GB); Danny Young, Ashbourne (GB)

(73) Assignee: Just2easy Limited, Ashbourne, Derbyshire (GB)

( * ) Notice: Subject to any disclaimer, the term of this patent is extended or adjusted under 35 U.S.C. 154(b) by 785 days.

(21) Appl. No.: 11/843,614

(22) Filed: Aug. 22, 2007

(65) Prior Publication Data
US 2008/0049043 A1 Feb. 28, 2008

(30) Foreign Application Priority Data

Aug. 22, 2006 (GB) .................................. 0616583.1

(51) Int. Cl.
*G09G 5/02* (2006.01)

(52) U.S. Cl. ........ 345/594; 345/589; 345/593; 345/715; 345/763; 345/810; 345/835

(58) Field of Classification Search ........................ None
See application file for complete search history.

(56) References Cited

FOREIGN PATENT DOCUMENTS

| | | |
|---|---|---|
| EP | 0689133 | 12/1995 |
| EP | 1361504 A2 | 11/2003 |
| GB | 2367731 | 4/2002 |

OTHER PUBLICATIONS

Michael Bostock, "Color Picker 2.0" Jan. 9, 2005 (first updated), accessed via web: http://www.vivificus.net/jimbon/tools/index.html on Jul. 27, 2010.*
Chastain, Sue ("Adobe Photoshop Basics—Lesson 3b: The Color Picker" About.com accessed via the web http://web.archive.org/20050915000000*/http://graphicssoft.about.com/od/photoshop/l/bIlps503b.htm. Internet Archive 1st reported snapshot date, Sep. 19, 2005).*
UK Search Report dated Nov. 15, 2006, Patent Application No. GB0616583.1.
UK Search and Examination Report dated Dec. 17, 2010, Application No. GB0616583.1.

* cited by examiner

*Primary Examiner* — Antonio Caschera
(74) *Attorney, Agent, or Firm* — Patterson & Sheridan, L.L.P.

(57) ABSTRACT

A method of displaying colors for selection by a user in which a range of first color attributes (e.g. hue) is displayed in a first linear selection bar. The first color attributes varying along the length of the first selection bar. The method further comprising displaying a range of second color attributes (e.g. saturation and brightness) in a second linear selection bar. The second color attributes varying along the length of the second selection bar. A method for selecting colors in which a color from under the pointer is selected as soon as it has been left in the same position for a predetermined period of time.

8 Claims, 4 Drawing Sheets

ON-SCREEN COLOUR SELECTION

CROSS-REFERENCE TO RELATED APPLICATIONS

This application claims benefit of Great Britain patent application number 0616583.1, filed Aug. 22, 2006, which is herein incorporated by reference.

BACKGROUND OF THE INVENTION

1. Field of the Invention

The present invention relates to on-screen colour selection. In particular, although not exclusively, the invention relates to the selection of a colour from a screen. The invention also relates to a method of displaying colours on a screen to facilitate selection.

2. Description of the Related Art

Conventional packages for creating or editing images and/or text enable the user to select a colour with which to touch up the image, draw a line, fill a block of space, or add text. Typically, there are two methods available to the user to make this selection. One of these is a colour "palette", in which a selection of colours is displayed, from which the user can select one or more colour for subsequent use. The other method is a "colour picker" tool which enables the user to select a colour displayed anywhere on the screen for use within the drawing package.

SUMMARY OF THE INVENTION

In accordance with one aspect of the present invention there is provided a method of displaying colours for selection by a user, comprising: displaying a range of first colour attributes in a first linear selection bar, the first colour attributes varying along the length of the first selection bar; and displaying a range of second colour attributes in a second linear selection bar, the second colour attributes varying along the length of the second selection bar.

Since the bars are linear, there is no need for them to be provided in a separate window. They can be arranged down one side, or along the top or bottom, of the main drawing window.

Preferably the first selection bar comprises pixels having hue values which vary along the length of the first selection bar. The second selection bar preferably includes pixels whose colour varies along the length of the bar from white to black via pale unsaturated colours, clear bright colour and dark saturated colours.

In a preferred embodiment the second selection bar comprises pixels having saturation and brightness values (in the HSV colour space, for example) which vary along the length of the second linear selection bar. Thus the user can select hue from the first linear selection bar, and the saturation/brightness combination from the second linear selection bar.

The saturation values of the pixels in the second selection bar may vary from a minimum at a first end of the second saturation bar to a maximum substantially in the middle of the second saturation bar. The brightness values of pixels in this region are preferably constant, and more preferably a maximum value (for example, 100%). The brightness values of pixels in the second selection bar may then vary from a maximum substantially in the middle of the second selection bar to a minimum at a second end of the second selection bar. The saturation values of pixels between the middle and the second end of the second bar are preferably constant, and more preferably a maximum value. These combinations make the most useful saturation/brightness combinations available to the user.

In accordance with another aspect of the present invention there is provided a method of choosing a colour for use in a drawing package, comprising: choosing a hue from a first linear selection bar, the first selection bar displaying a range of hues; and choosing other attributes of the colour from a second linear selection bar displaying a range of the other attributes. The colours for selection are preferably displayed using a method as described above.

In accordance with a further aspect of the present invention there is provided a method of choosing a colour from a display screen, comprising: providing a pointer movable over the display screen; and selecting the colour on the display screen beneath the pointer when the pointer has been left in the same position for longer than a predetermined period of time. The selected colour may be transferred to a pipette selection box. The colour selection is preferably performed without operation of a pointer activation mechanism by a user (i.e. the selection is performed without the need for a "mouse click"). This means that the user need not select a "pipette tool" to capture colours from elsewhere on the screen for use in a drawing window.

The invention also provides a computer program arranged to carry out any of the methods described above, and a computer readable medium having saved thereon instructions for carrying out any of the methods described above.

BRIEF DESCRIPTION OF THE DRAWINGS

Some preferred embodiments of the invention will now be described by way of example only and with reference to the accompanying drawings, in which.

DETAILED DESCRIPTION

Figure 1:
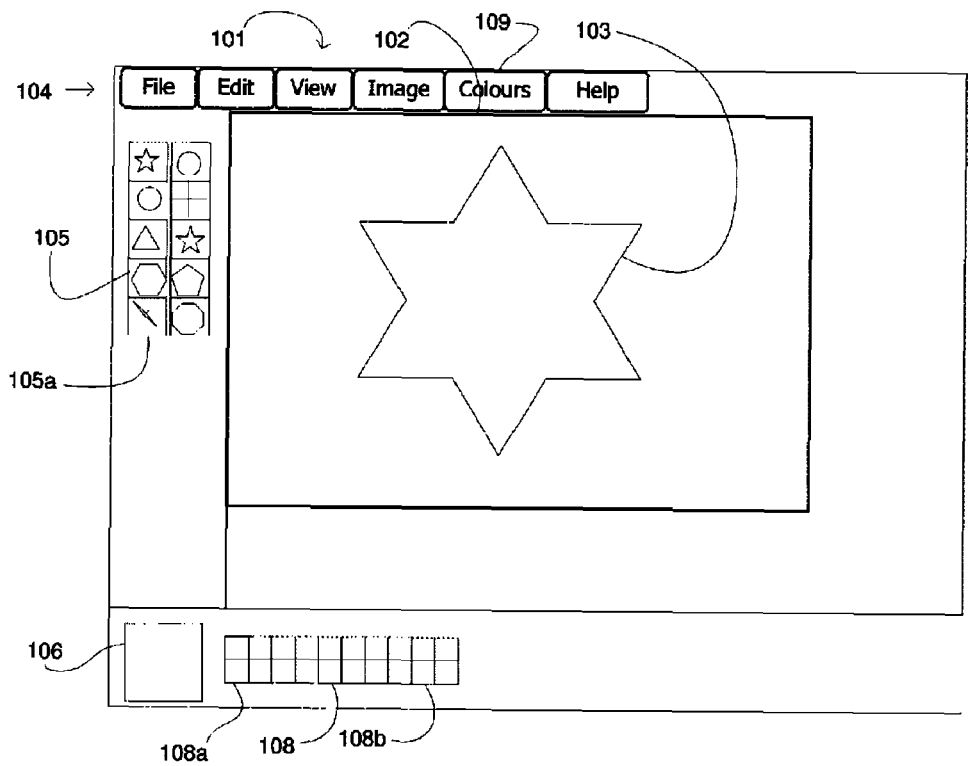
FIG. 1 is a schematic representation of a window showing a conventional colour palette.

FIG. 1 is a schematic representation of a window 101 opened by a conventional drawing package, illustrating the colour management systems available. The window 101 includes a drawing area 102, containing an image 103. Above the drawing area 102 is a series of menu buttons 104, each opening a drop-down menu. A range of tool buttons 105 enables the user to select from a variety of tools, for example for free-form drawing or for filling blocks of colour. A colour selection area 106 displays the colour currently selected by the user. A colour palette 108 provides a set of boxes 108*a*, 108*b* etc. containing a selection of discrete colours which can be selected by the user. If the user places a pointer over one of these boxes 108*a* and activates the pointer mechanism (e.g. a "left-click" on a mouse) then the colour in that box is transferred to the colour selection area 106. The colour displayed in the colour selection area 106 may then be used by the user for drawing or inserting text, etc.

The colour palette 108 shown in FIG. 1 has the advantage that the colours are immediately accessible to the user, but the disadvantage that there is a limit to the number of different colours available in a series of discrete boxes. This is a particular problem when touching up photographs, where very precise colours may be required. Colours may be defined as being made up of red, green and blue components (RGB), and each usually has a value in the range 0 to 255. This means that a total of 256×256×256=16,777,216 unique colours are possible. In the window shown in FIG. 1, only 20 of these colours are available to the user.

Figure 2:
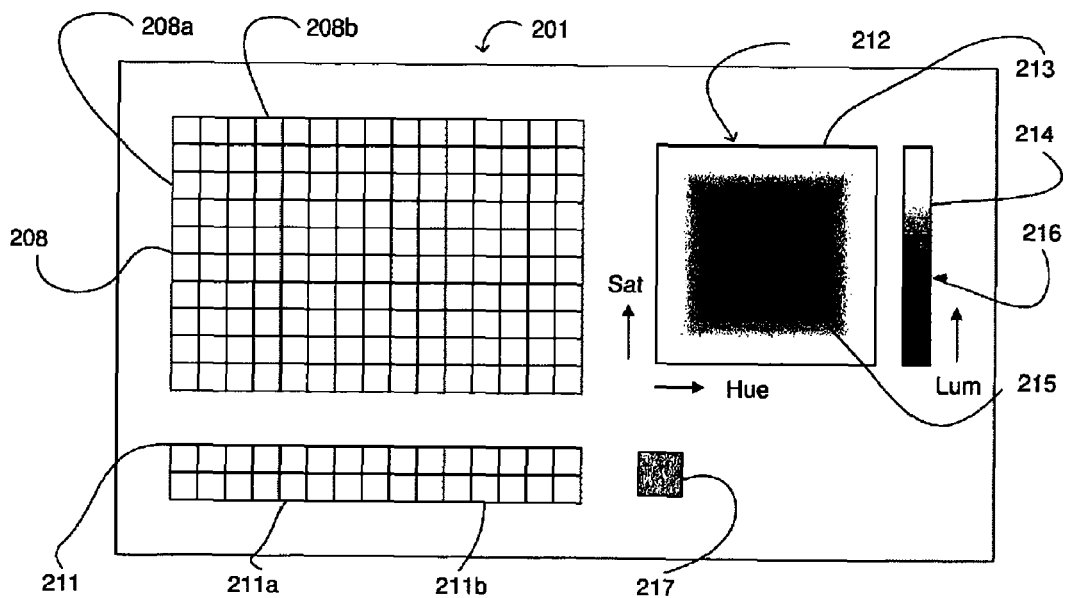
FIG. 2 is a schematic representation of a window showing a continuous colour palette.

One way in which this problem can be overcome is to provide the option of a more complete palette in another window. In the example of FIG. 1, this may be selected from an option in the drop-down menu button 109 labelled "Colours". FIG. 2 shows a typical colour selection window 201 providing a larger palette 208, again having boxes 208a, 208b etc. containing discrete colours. This provides the user with a larger choice of colours—48 in this example.

The colour selection window 201 also contains an additional palette 211, providing boxes 211a, 211b etc. into which the user can insert "custom" colours of their own choosing. A custom colour is selected using a continuous colour palette 212. The continuous colour palette relies on the fact that, instead of using the RGB colour space defined above, colours can also be defined in terms of their hue, lightness (or luminosity) and saturation components (HLS). Hue defines the "colour", and varies from red, through yellow, green, blue, and back to red again, as it varies from 0 to 255. Lightness varies from 0 (black) to 255 (white). Saturation defines the colour intensity and varies from 0 (grey) to 255 (pure colour).

The continuous colour palette is made up of a square box 213 and a linear box 214. The square box 213 displays all of the colours available at a single lightness. Each pixel in the box has a saturation and hue defined by its co-ordinates within the box. Hue varies from 0 to 255 along the x-axis of the box 213, and saturation varies from 0 to 255 along the y-axis of the box 213. A cross-hair 215 enables the user to select any pixel within the box 213, providing for any hue/saturation combination.

The linear box 214 displays pixels having the hue and saturation chosen from the square box 213, but with lightness running from 0 (black) at the bottom to 255 (white) at the top. A marker 216 shows the current lightness selection, and can be moved up and down the box 214. Thus having chosen the colour (and colour intensity) in the square box 213, the lightness is then chosen using the linear box 214. The currently selected colour is illustrated in a selection box 217. When the colour in the selection box 217 meets the requirements of the user, it can be exported to one of the boxes 211a of the custom palette 211. It may then be selected for use in the colour selection area 106.

Another frequently used system, similar to that shown in FIG. 2, uses another model for definition of colour, known as the "HSV" (or sometimes "HSB") model. In this model, the colours are defined in terms of hue, saturation and "value" (or "brightness"). As with HLS, hue defines the "colour" of a pixel, and is typically defined to vary between 0 and 360. The saturation is typically defined to vary between 0 (no colour—therefore white, grey or black) and 100% (fully saturated—colour or black). The value, or brightness, is typically defined to vary between 0 (black) and 100% (bright). A high brightness provides white if the saturation is low, but provides a pure, bright colour if the saturation is high. A high saturation provides black if the brightness is low, but a pure, bright colour if the brightness is high.

Figure 3:
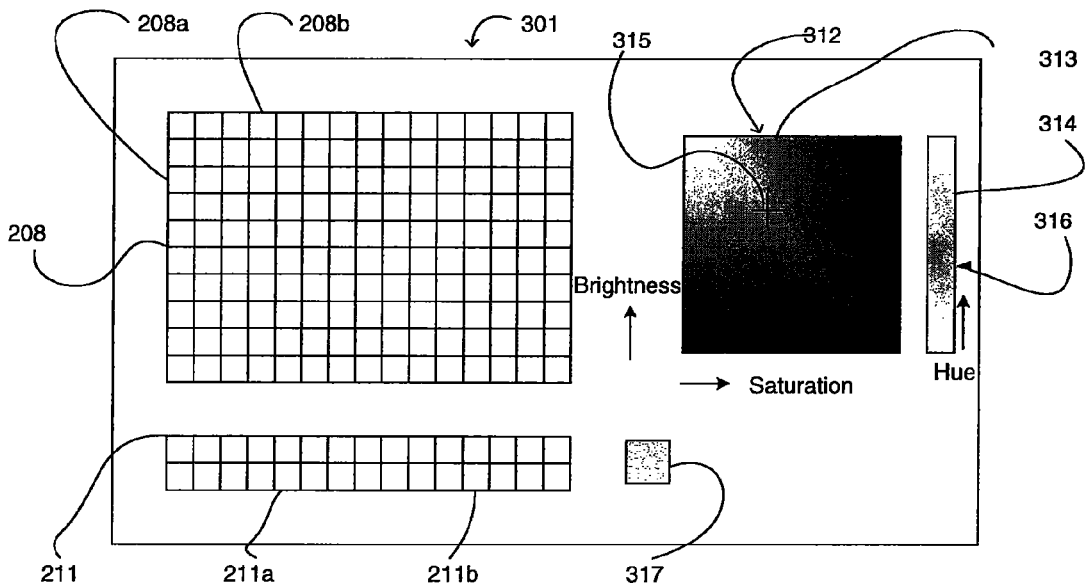
FIG. 3 is a schematic representation of an alternative continuous colour palette.

FIG. 3 shows a window 301 having a continuous colour palette 312 making use of the HSV system. The continuous colour palette includes a linear strip 314, where hue varies along its length. Alongside this is a square box 313 in which the saturation varies from 0 to 100% along the x-axis, and brightness varies from 0 to 100% along the y-axis. The palette also contains a selection box 317 displaying the currently selected colour. The user will generally choose the hue first from the linear strip 314, using a pointer 316. The pixels in the square box 313 change hue to match the hue selected from the linear strip 314. A crosshair 315 can then be moved over the square box to choose an appropriate saturation and brightness. The top left hand corner of the square box 313 has 100% saturation and 0% brightness, and is white. The top right hand corner has 100% saturation and brightness, and shows a pure, bright colour. The bottom of the square box 313 is black (0% brightness). Down the right hand side the pure colour fades to black at the bottom left (100% saturation, 0% brightness). Down the left hand side the white colour fades through grey to black (0% saturation, 0% brightness).

These systems enable the user access to any colour, but it is cumbersome for the user to choose colours which are not already provided in the simple palette 108 shown in FIG. 1. The necessity of opening an additional window is a nuisance. The size of the square box 212 precludes the possibility of keeping the palette in the main window 101 of the drawing package, since it would take up too much space. It would be desirable to provide a colour palette small enough to display in the main window, but which provides a large range of colours for the user.

Another method for choosing colours involves the use of a "pipette". In the example of FIG. 1, this is achieved using a pipette tool, which is one of the tools 105a operated from the tool buttons 105. Once the pipette tool is selected, the user may move the pointer to anywhere over the drawing area 102, and select the colour under the pointer, which is immediately transferred to the colour selection area 106. In some drawing packages, when the pipette tool is selected the pointer may be placed anywhere on the whole desktop or screen (including outside the drawing package window 101), and used to select the colour beneath it. This means, for example, that a colour can be selected from another part of a picture, or even from another picture entirely.

Figure 4:
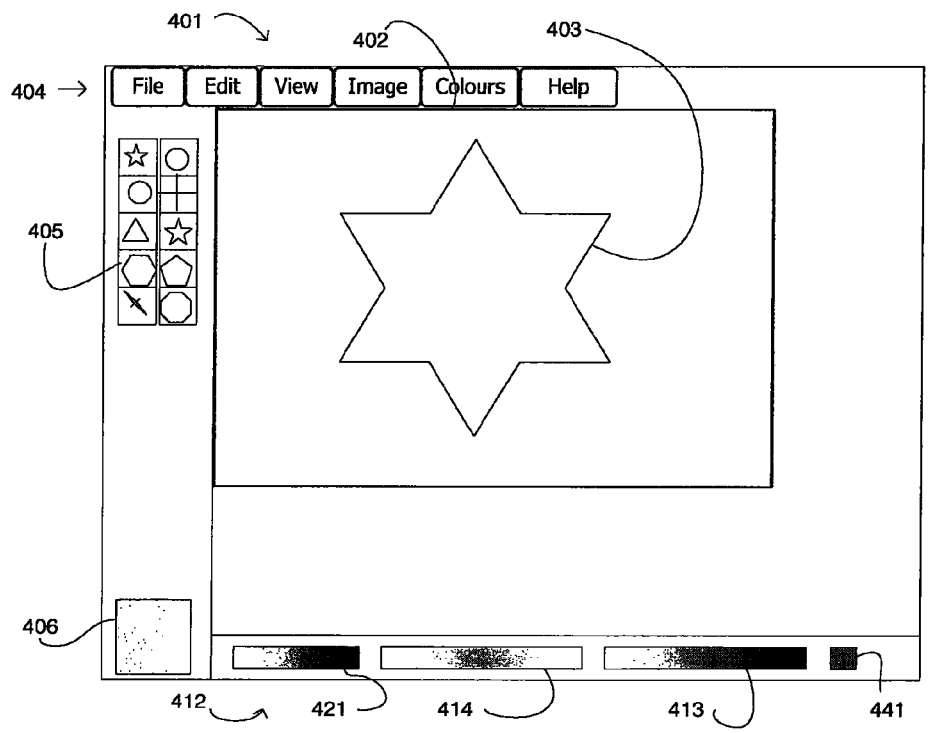
FIG. 4 is a schematic representation of a drawing package window with an alternative continuous colour palette.

FIG. 4 is a representation of a window 401 of a drawing package, similar to that shown in FIG. 1. The window 401 includes a drawing area 402, containing an image 403. Above the drawing area 402 is a series of menu buttons 404, each opening a drop-down menu. A range of tool buttons 405 enables the user to select from a variety of tools, for example for free-form drawing or for filling blocks of colour. A colour selection area 406 displays the colour currently selected by the user.

A colour palette 412 is provided in the form of three linear boxes 421, 414, 413. The left hand box 421 provides a "greyscale" option, and the colour varies from white at one end, through grey, to black at the other. The colour can be made to vary continuously, or, if preferred, as a series of discrete blocks. The user places the pointer over this box and activates the pointer to select an appropriate greyscale, which is then displayed in the colour selection area 406.

The greyscale box 421 is a discrete palette which is particularly useful for selecting colour for text, and operates independently of the remainder of the palette, which comprises the central and right hand boxes 414, 413. The central box 414 displays a full range of hues (in the same way as the linear box 314 of FIG. 3). The hues are shown at 100% saturation and 100% brightness (as defined in the HSV model). The user can select any hue by placing the pointer over the relevant part of the hue box 414 and activating it. The right hand box 413 displays a range of saturation and brightness levels (using the HSV colour space) for the chosen hue, and thus takes the place of the square box 313 of FIG. 3. It will be appreciated that the square box 313 shows every possible combination of saturation and brightness, but that this is not possible using the linear box 413. Instead, the linear box is used to display the saturation and brightness combinations most likely to be useful to the user. This is achieved by varying the saturation and brightness individually along the length of the box 413. At the left hand end of the box 431 the saturation is 0% and the brightness is 100%, resulting in a white colour. Moving along the box, the saturation increases while the brightness is kept constant at 100%, until at the centre of the box 433 the saturation and brightness are both 100%, resulting in a bright, pure, fully saturated colour. Continuing to the right, the brightness is now decreased while the saturation is kept constant at 100%, until at the right hand end 432 the saturation is 100%, the brightness is 0 and the colour is black. In other words, the colour moves from white via pale unsaturated colours to a pure colour, and then via dark, saturated colours to black.

Figure 5:
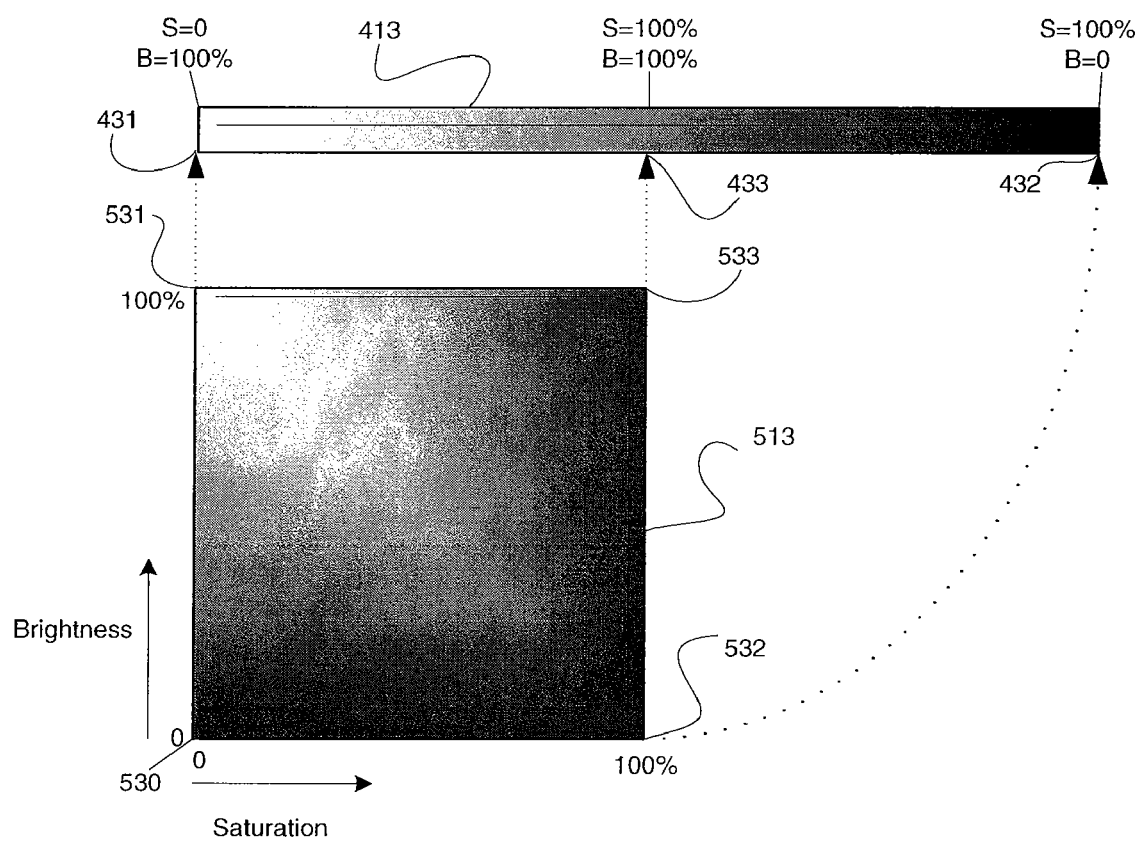
FIG. 5 is a schematic representation of the saturation and brightness selection used to generate the palette of FIG. 4.

This system can be understood with reference to FIG. 5. FIG. 5 shows a two-dimensional representation 513 of all saturation and brightness combinations in the HSV colour space, and is thus similar to the square box 313 shown in FIG. 3. Saturation (S) varies along the x-axis and brightness (B) varies along the y-axis. At the origin 530 (S=0, B=0) the colour is black. At the top end 531 of the y-axis (S=0, B=100%) the colour is white. Along the y-axis, the colour varies from black to white through grey. At the right hand end of the x-axis 532 (S=100% B=0) the colour is black. The colour is in fact black along the whole length of the x-axis. In the top right hand corner 533 of the representation 513 (S=100%, B=100%) the colour is a pure, bright colour.

FIG. 5 also shows a representation of the linear box 413 shown in FIG. 4. The colours selected for use in the linear box 413, moving from left to right, are those obtained by moving along the top of FIG. 5 from the top 531 of the y-axis (S=0, B=100%) to the top right hand corner 533 (S=100%, B=100%), and then down the right hand side to the right hand end 532 of the x-axis (S=100%, B=0). Thus the left hand edge 431 corresponds to the top 531 of the y-axis (S=0, B=100%), where the colour is white. Moving to the centre 433 of the linear box corresponds to a move to the top right hand corner 533 of the representation 513 (S=100%, B=100%), and the colour goes through pale, unsaturated shades to a pure bright colour as this happens. Movement from the centre 433 to the right hand side 432 of the linear box 413 corresponds to movement down the right hand side of the representation 513 from the top right hand corner to the right hand end 532 of the x-axis (S=100%, B=100%), and the colour varies from a pure colour to black as this happens.

Once the user has selected hue from the hue box 414, he then proceeds to select the saturation/brightness combination from the saturation/brightness box 413. The selected colour is then displayed in the colour selection area 406, and may then be used for drawing, filling in, typing, etc. Although there are fewer saturation and brightness combinations than would be available from a conventional square box, in practice the options available in the linear box cover most likely necessities. Since the box is in the form of a linear strip it can be included in the main drawing package window 401, and does not need to be accessed via a separate window.

Figure 6A:
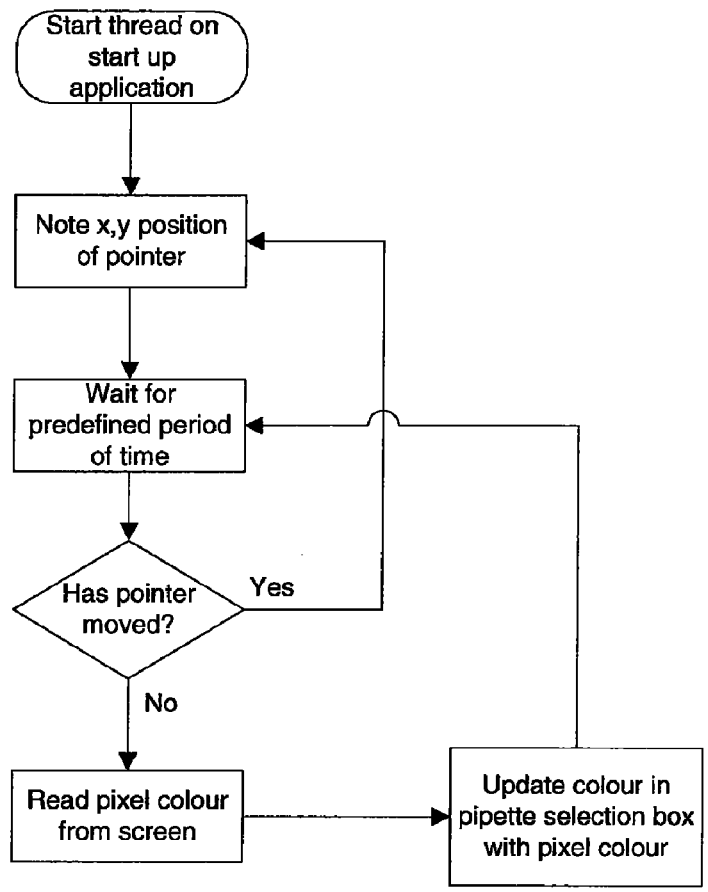
FIG. 6A is a flow chart illustrating the operation of a "modeless" pipette tool.
Figure 6B:
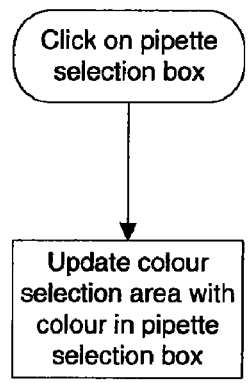
FIG. 6B is a flow chart illustrating the selection of a colour imported by the tool of FIG. 6A.

The drawing package window 401 also includes a pipette selection box 441, located next to the palette 412. This is used in place of (or in addition to) the pipette tool described with reference to FIG. 1. If the pointer is left in one place anywhere on the screen for more than a predetermined period of time (for example three seconds), the colour under the pointer is immediately transferred to the pipette selection box 441. The procedure for this is illustrated in FIG. 6A. The user can then select this colour, using the activation of the pointer over the pipette selection box 441, to be inserted into the colour selection area 406, as illustrated in FIG. 6B. The transfer of the colour under the pointer to the pipette selection box 441 takes place whether or not a specific "pipette" tool has been selected from the toolbar 405. This means that the user can be working with a specific tool (e.g. an area fill tool), and simply move the pointer to anywhere on the screen to choose a colour shown on the screen. There is no need to call up a specific "pipette" tool, with the associated necessity of cancelling the tool currently in use.

It will be appreciated that variations from the above described embodiments may still fall within the scope of the invention. For example, the examples described all include one colour selection area 406, into which colours selected from the palette 412 or pipette selection window 441 can be inserted. Such colours may be inserted into a drawing via a pointer activation. However, it may be that larger palettes of two or more discrete colours may be displayed within the drawing package window, which can be populated using the continuous palette 412 or the pipette selection window 441. Alternatively, a conventional pipette tool may also be used to assist with the population of a palette with a plurality of discrete colours. It will also be understood that the linear continuous palette 412 in the drawing window does not preclude the use of a further, complete, conventional continuous palette accessible through another window.

Furthermore, although the brightness/saturation box 413 of the linear continuous palette was defined in terms of the HSV colour model, it will be appreciated that other definitions could also be used. The user is preferably provided with colours ranging through white, pale unsaturated colours, clear bright colour, and dark saturated colours to black. Such a range of colours could also be determined using other colour spaces as starting points. It is not critical that the point of maximum saturation and brightness (defined in HSV terms) is precisely in the centre of the saturation/brightness box: it is conceivable that it is located nearer one end than the other.

In addition, it will further be appreciated that the ranges of hue, saturation and brightness are intended to be illustrative only. In some HSV colour models, hue, saturation and brightness may all be defined to range between 0 and 255, and any suitable range giving the required properties may be used.

While the foregoing is directed to embodiments of the present invention, other and further embodiments of the invention may be devised without departing from the basic scope thereof, and the scope thereof is determined by the claims that follow.

The invention claimed is:

1. A method of displaying colours for selection by a user, comprising:
   displaying via a computer a range of first colour attributes in a first linear selection bar on a display screen, the first colour attributes varying along the length of the first selection bar, wherein the first selection bar comprises pixels having hue values which vary along the length of the first selection bar; and
   displaying a range of second colour attributes in a second linear selection bar on the display screen, the second colour attributes varying along the length of the second selection bar, wherein the second selection bar comprises pixels having saturation and brightness values which vary along the length of the second linear selection bar, wherein the saturation values of the pixels in the second selection bar vary from a minimum at a first end of the second saturation bar to a maximum substantially in the middle of the second saturation bar.

2. The method as claimed in claim 1, wherein the brightness values of pixels between the first end and the middle of the second bar are constant.

3. The method as claimed in claim 2, wherein the brightness values of the pixels between the first end and the middle of the second selection bar are all a maximum value.

4. A non-transitory computer readable storage medium having saved thereon instructions for carrying out the method of claim 1.

5. A method of displaying colours for selection by a user, comprising:

displaying via a computer a range of first colour attributes in a first linear selection bar on a display screen, the first colour attributes varying along the length of the first selection bar, wherein the first selection bar comprises pixels having hue values which vary along the length of the first selection bar; and displaying a range of second colour attributes in a second linear selection bar on the display screen, the second colour attributes varying along the length of the second selection bar, wherein the second selection bar comprises pixels having saturation and brightness values which vary along the length of the second linear selection bar, wherein the brightness values of pixels in the second selection bar vary from a maximum substantially in the middle of the second selection bar to a minimum at a second end of the second selection bar.

6. The method as claimed in claim 5, wherein the saturation values of pixels between the middle and the second end of the second bar are constant.

7. The method as claimed in claim 5, wherein the saturation values of the pixels between the middle and the second end of the second selection bar are all a maximum value.

8. A non-transitory computer readable storage medium having saved thereon instructions for carrying out the method of claim 5.

* * * * *